US006136239A

United States Patent [19]

Lundgren et al.

[11] Patent Number: 6,136,239

[45] Date of Patent: *Oct. 24, 2000

[54] METHOD OF MANUFACTURING LIGNOCELLULOSIC BOARD

[75] Inventors: Göran Lundgren, Alnö; Kurt Schedin; Lars-Otto Sislegärd, both of Sundsvall; Sven-Ingvar Thorbjörnsson, Karlstad, all of Sweden

[73] Assignee: Valmet Fibertech Aktiebolag, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/666,442

[22] PCT Filed: Jan. 19, 1995

[86] PCT No.: PCT/SE95/00043

§ 371 Date: Jun. 26, 1996

§ 102(e) Date: Jun. 26, 1996

[87] PCT Pub. No.: WO95/20473

PCT Pub. Date: Aug. 3, 1995

[30] Foreign Application Priority Data

Jan. 28, 1994 [SE] Sweden .................................. 9400266

[51] Int. Cl.[7] ..................................................... B29C 43/22

[52] U.S. Cl. .......................... 264/101; 264/112; 264/115; 264/120; 264/128

[58] Field of Search .................................... 264/109, 112, 264/113, 128, 122, 101, 102, 115, 120; 425/371, 373

[56] References Cited

U.S. PATENT DOCUMENTS

| | | | |
|---|---|---|---|
| 3,230,287 | 1/1966 | Caron et al. | 264/120 |
| 3,907,630 | 9/1975 | Selander . | |
| 4,175,150 | 11/1979 | Luck et al. | 264/128 |
| 4,378,265 | 3/1983 | Kiss . | |
| 4,393,019 | 7/1983 | Geimer | 264/128 |
| 4,517,147 | 5/1985 | Taylor et al. | 264/109 |
| 4,810,445 | 3/1989 | Lamb, Sr. et al. . | |
| 4,923,656 | 5/1990 | Held . | |
| 4,976,905 | 12/1990 | Brown . | |
| 5,063,010 | 11/1991 | Fischer et al. | 264/109 |
| 5,195,428 | 3/1993 | Gawlitta et al. . | |
| 5,302,332 | 4/1994 | Simola et al. . | |
| 5,342,566 | 8/1994 | Schafer et al. . | |
| 5,433,905 | 7/1995 | Tisch | 264/109 |
| 5,435,954 | 7/1995 | Wold . | |
| 5,482,666 | 1/1996 | Larsson . | |
| 5,492,756 | 2/1996 | Seale et al. . | |
| 5,658,407 | 8/1997 | Thorbjornsson . | |
| 5,711,972 | 1/1998 | Schedin et al. . | |
| 5,728,269 | 3/1998 | Kohno et al. . | |
| 5,762,980 | 6/1998 | Bielfeldt | 425/371 |
| 5,902,442 | 5/1999 | Phillips et al. . | |

FOREIGN PATENT DOCUMENTS

| | | |
|---|---|---|
| 0 383 572 B1 | 11/1994 | European Pat. Off. . |
| 2 058 820 | 5/1972 | Germany . |
| 36 40 682 A1 | 6/1988 | Germany . |
| 95/204473 A1 | 8/1995 | WIPO . |
| 95/20473 A1 | 8/1995 | WIPO . |

*Primary Examiner*—Jan H. Silbaugh
*Assistant Examiner*—Kenneth M. Jones
*Attorney, Agent, or Firm*—Lerner, David, Littenberg, Krumholz & Mentlik, LLP

[57] ABSTRACT

Continuous methods for manufacturing finished board are disclosed which include disintegrating lignocellulose material prior to drying, gluing, and forming into mats, and in which the pressing of the mat into a board includes a first step in which the mat is pressed in the presence of steam in a heating medium to produce a partially pressed board having a substantially uniform density, and a second compressing step in which the outer layers of the partially pressed board are increased in density as compared to the center of the board.

19 Claims, 3 Drawing Sheets

METHOD OF MANUFACTURING LIGNOCELLULOSIC BOARD

FIELD OF THE INVENTION

The present invention relates to the manufacture of board products from lignocellulosic material.

BACKGROUND OF THE INVENTION

Methods of manufacturing board from raw materials which are based on lignocellulose are well-known and widely applied. These manufacturing processes generally comprise the following steps: disintegration of the raw material to particles and/or fibers of a suitable size, drying to a definite moisture ratio and gluing the material prior or, subsequent to the drying, forming the glued material into the form of a mat, which can be built up of several layers, possibly cold prepressing, preheating, surface nozzle-spraying in some instances, and hot pressing simultaneously with pressure and heat applied in either a discontinuous or a continuous press, to produce a finished board.

During conventional hot pressing, the pressed material is primarily heated by means of thermal conduction from the adjacent heating plates or steel belts which have a temperature of 150° to 250° C., depending on the type of product being pressed, the glue used, the desired capacity, and other such factors. The moisture of the material which is closest to the heat source is thus evaporated, whereby as the pressing continues a dry layer develops and a steam front successively moves from each side inward to the center of the board. The temperature in this developing layer rises to at least 100° C., which causes normal glues to cure. When the steam front has arrived at the center of the board, the temperature there has risen to at least 100° C. and the board begins to harden, even at the center at which point pressing can be terminated within a number of seconds. This applies to the use of conventional urea formaldehyde glue (UF) and similar glues, such as melamine-fortified glues (MUF). When other glues with higher curing temperatures are used, a higher temperature and a higher pressure must develop in the board before curing can take place. In connection with conventional hot pressing, methods have been developed to control the density profile of the board in the thickness direction. In most cases it is desired to achieve a high density in the surface layers in order to improve paintability, strength and the like, and a reasonably low density in the central layer, i.e., as low as possible for holding the board weight and cost down, but sufficiently high for achieving an acceptable internal bond strength and the like. During the manufacture of particle board, more finely disintegrated particles with a slightly higher moisture content in the surface layers often have been used, for example, in order to achieve a higher density in the surface layers of the board. During the manufacture of MDF (Medium Density Fiberboard), which have a homogeneous material structure, methods have been developed by utilization of a controlled distance between the heat sources in order to approach the final position successively in a predetermined manner as the steam front moves inward towards the center. See, for example, Swedish patent No. 469,270 for a continuous press, and Swedish pat. appln, No. 93 00772-2 for a single opening discontinuous press. These methods, which were developed for MDF, are now at least partly used for other types of board.

In order to achieve the desired density profile, a press must be capable of applying a high surface pressure at high temperatures. This in itself is no problem for a discontinuous press. However, such a press has other disadvantages, such as, for example, inferior thickness tolerances. For continuous presses the required high surface pressure and simultaneously high temperature have resulted in the need for expensive precision solutions for the roller table between the steel belt and the underlying heating plate. The method of supplying heat to the board by means of thermal conduction further entails heating which takes a relatively long time, which thus results in great press lengths (large press surfaces). Presses up to about 40 m in length have thus been delivered. Furthermore, with a continuous press it is practically impossible to make the heating plates of the press sufficiently flexible and, therefore, the density profile cannot be formed with as great a freedom as in the case of discontinuous pressing.

In addition, the continuous presses utilized to-day are restricted as regards temperature (because of the lubricating oil in the roller table), which means that not all types of board can be pressed.

Another method of board manufacture, which is based on the supply of steam in between the heating plates in a discontinuous press, has also been found to have limited use. The material in that case is heated within seconds of the supply of steam and, therefore, the heating time can be radically shortened. Moreover, after the steam has been supplied the resistance of the material against compression reduces considerably. This is a positive feature, thus implying that the press could be designed with less press power, and with a much shorter length (smaller press surface). In order to achieve a desired density profile of a boards manufactured according to this method, however, it is necessary for conventional pressing techniques with a high surface pressure and thermal conduction from conventional heating plates at the beginning of the press cycle to be applied, whereby a surface layer with a high density can be obtained after a long heating period. Thereafter, steam can be injected for heating the central part of the board. This has given rise to problems, because steam has to be blown through the newly formed surface layer with a high density, and because the pressing time during the period of high pressures and thermal conduction has been extended considerably. As a consequence, a steam press operating according to this concept has a much lower capacity, a larger press surface, and requires a high press power than would be required if a uniform density had been attained.

During all of the manufacturing methods referred to above, a soft surface layer is obtained, which has lower strength, unacceptable paintability, etc., which implies that this layer must be removed, such as by grinding. The resulting material loss is 5–15%, depending on the type of board, its thickness, etc.

One object of the present invention is to provide a method of continuous pressing of board of lignocellulosic material, which renders it possible to make use of the advantages of steam heating, i.e., so that the equipment can be designed with considerably smaller press surface and with lower press power, i.e., less expensive, and preferably without heating plates, whereby the present precision solutions with roller tables can be eliminated, thus rendering the equipment even less expensive, and yet having the possibility of achieving desired density profiles.

Another object of the present invention is to make the manufacturing process so flexible that different density profiles and surface properties can be formed in new ways and thereby new fields of application for board can be created.

SUMMARY OF THE INVENTION

In accordance with the present invention, these and other objects have now been accomplished by the discovery of a continuous method for manufacturing finished board product from lignocellulose containing material which comprises disintegrating the lignocellulose containing material, drying the disintegrated lignocellulose containing material, gluing the dried lignocellulose containing material, forming the glued lignocellulose containing material into a mat, pressing the mat into the form of a board, the pressing of the mat comprising initially passing the mat in the presence of steam in a heating medium in order to produce a partially pressed board having a center and first and second surface layers with a substantially uniform density and subsequently compressing the first and second surface layers of the partially pressed board in order to increase the density of the first and second surface layers as compared to the density of the center of the partially pressed board, thereby producing a compressed board, and hardening the compressed board in order to produce this finished board product.

In accordance with one embodiment of the continuous method of the present invention, the initial pressing of the partially pressed board comprises compressing the partially pressed board to a predetermined thickness and expanding the compressed partially pressed board to a final thickness greater than the predetermined thickness.

In accordance with another embodiment of the continuous method of the present invention, the initial pressing of the partially pressed board is carried out in the presence of a sufficient amount of steam such that air included in the mat is expelled therefrom.

In accordance with one embodiment of the continuous method of the present invention, the method includes storing the partially pressed board prior to subsequent pressing step. In another embodiment, however, the method includes immediately transferring the partially pressed board to a subsequent pressing step.

In accordance with another embodiment of the continuous method of the present invention, the gluing of the dried lignocellulosic containing material comprises utilizing a glue having sufficient bond strength so as to form a bond in the initial pressing of the partially pressed board but so as not to form a final bond in the first and second surface layers until the subsequent pressing step.

In accordance with another embodiment of the continuous method of the present invention, the method includes forming the glued lignocellulosic containing material into a mat comprising a plurality of mat layers, including first and second surface mat layers, and including initially pressing the mat so as to initially harden the first and second surface mat layers.

In accordance with another embodiment of the continuous method of the present invention, the method includes softening the first and second surface layers of the partially pressed board in connection with the subsequent compressing step. In accordance with another embodiment, the lignocellulosic containing material has a glass transition temperature, and the method includes subsequently compressing the first and second surface layers of the partially pressed board while heating the first and second surface layers to a temperature of greater than about 50° C. above the glass transition temperature.

In accordance with another embodiment of the continuous method of the present invention, the method includes coating the first and second surface layers of the partially pressed board with a liquid film prior to the subsequent pressing step. Preferably, the liquid film contains dissolved glue. In another embodiment, the liquid film contains a surface sealing agent. In yet another embodiment, the liquid film includes softening chemicals.

In accordance with another embodiment of the continuous method of the present invention, the method includes pretreating the first and second surface layers of the partially pressed board with a material selected from the group consisting of gas and steam prior to the subsequent compressing step. In another embodiment, the initial pressing of the mat includes a first pressing step free of steam for compressing the mat to a density of between about 150 and 500 kg/m$^3$, and most preferably to a density of between about 250 and 450 kg/m$^3$.

In accordance with another embodiment of the continuous method of the present invention, the initial pressing of the mat comprises compressing the mat to a density of between about 150 and 900 kg/m$^3$.

In accordance with the present invention, the pressing is carried out in two steps, in a manner such that in the first step the board is given a uniform or straight density profile, while in the second step, the density of the surface layers is formed and steam is used for heating the board in the first step.

In the first step of the present invention, the mat is compressed to a moderate density, whereafter steam is supplied, and the mat is then compressed further to the final density for step 1. Thereafter the board is allowed to entirely or partially harden in a holding section.

In the second step of the present invention the surface layers are affected substantially by heat and pressure, so that the surface material is softened for a period sufficiently long to obtain surface layers with the desired depth and increase density. The treatment in step 2 can be carried out in several ways and with different objects, depending on the final product which is desired. In an alternative embodiment, the fibers have originally been glued with glue having a composition such that in step 1 a bond is obtained which is sufficient to produce a board, and further such that final bonding in the surface layers takes place by means of the heat and pressure treatment in step 2.

In yet another embodiment the board is formed as a three-layer board, in that the central layer has cured during step 1, but where the glue of the surface layer has not yet cured completely during that step.

In a third embodiment of the present invention, the softening of the surface layers in step 2 takes place by applying a liquid, which can contain glue, a surface-sealing agent, or other chemicals.

In a fourth embodiment of the present invention, the surface layers on the manufactured board are treated with gas or steam by means of applying a controlled amount of such gas or steam to each such surface.

In a further embodiment of the present invention the softening in step 2 can be carried out by utilizing a chemical having a known softening effect.

The method according to the present invention incorporates an essential difference, particularly as compared with conventional board pressing, that a board with a desired central density can be subjected to a final pressing step, and such that re-heating of the surface layers softens them so as to render them reformable, but at the same time does not deteriorate the already hardened central layer. The present process thereby renders it possible to press at a lower pressure and for a shorter time (smaller total press surface).

In a preferred embodiment of the process of the present invention, according to step 1 the mat produced in the forming station (which mat can be unpressed, or cold-pressed in a separate belt pre-press, if it is desired both to better manage the belt transitions and to more easily indicate possible metal) is first compressed, in a press inlet of a roller press provided with wires, to a density of between about 150 and 500 kg/m$^3$. Steam is then supplied through the surface by means of steam chest(s) and/or steam roller(s). The mat is then successfully compressed further to a thickness slightly below the final desired thickness by means of pairs of rolls, whereafter the mat is allowed to expand and harden in a holding section (calibration zone) with rolls. the roller press in this case should be heated so that condensation is avoided when steam is supplied. By carrying out such small over-compression to below the final thickness, the surface pressures required in the holding section are very low and, therefore, the press can be designed with a light-weight construction. Contrary to all previously known presses for the manufacture of lignocellulosic board it has now been found possible, from a process-technical viewpoint, to obtain board with good properties even at high densities, in spite of the fact that in the holding section in step 1 no heating plates are used.

In the continuous roller press steam is supplied continuously, and a small surplus of steam exceeding the amount required for heating the mat is added, whereby it is ensured that all air included in the mat is pressed rearward in the inlet, which further ensures that all parts of the mat are heated.

In an alternative embodiment of steam chest and/or suction box can be arranged in the holding section for controlling the board temperature, moisture and included pressure.

The board thus pressed in step 1 can proceed to intermediate storage when the board is intended to be subsequently made-up (surface treated) in step 2, or it can continue directly to step 2 for surface treatment.

In a preferred embodiment of the process according to step 2, the board is passed through one or more pairs of hot rolls, whereby the surface layer is successively heated and is compressed further due to the temperature and linear load of the rolls. Depending on the intended field of application for the board, the treatment can consist of a few press nips at moderate pressures in order to create only a thin "skin" for example, for improved paintability, to a plurality of press nips with higher linear loads in cases when a thicker surface layer with increased surface density is desired, i.e., for products similar to conventional board. By means of this treatment the aforementioned grinding can often be reduced or eliminated, which results in a substantial saving. It is important for the process in step 2 that the rolling temperature can be controlled accurately in a known manner, preferably by hot oil heating.

In order to improve desired effects on the surface layer, the surface layers as mentioned before can have been prepared before the roll inlet.

In an alternative embodiment of step 2 the press according to step 2 is provided with a steel belt, and alternatively a wire. In this manner, the heat losses from the board between the roll pairs are reduced, and the desired effect is therefore more easily achieved, alternatively, a smaller number of roll nips is required.

BRIEF DESCRIPTION OF THE DRAWINGS

The present invention may be more fully appreciated with reference to the following detailed description, which refers to the figures in which.

DETAILED DESCRIPTION

Figure 1:
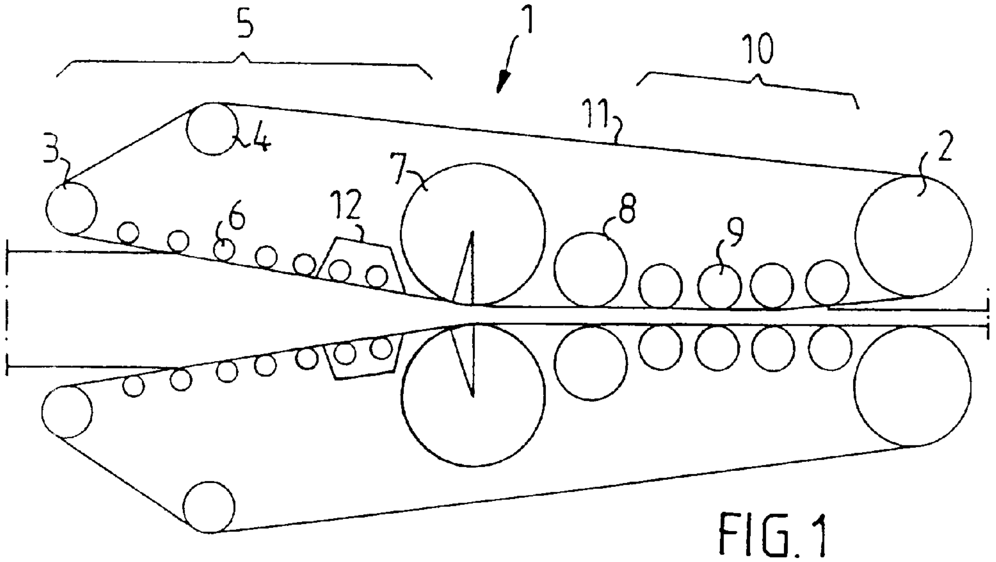
FIG. 1 is a side, elevational, partially schematic view of a heated belt press for use in step 1 of the method of the present invention, and in which the belts are perforated belts or wires, and the press is provided with apparatus for the supply of steam.

Referring to the Figures, in which like reference numerals refer to like elements thereof, FIG. 1 shows an embodiment of step 1 utilizing a belt press 1, which in a known manner is provided with drive rollers 2, stretching rollers 3, guide rollers 4 and an adjustable inlet portion 5 with inlet roller 6, steam roller 7, compression roller 8 and rollers 9 in a holding section 10 and surrounding wire 11, which alternatively can be perforated steel belt with wire. In the inlet portion 5 the mat is compressed to a predetermined density in the range of from about 150 to 500 kg/m$^3$, and preferably from about 250 to 400 kg/m$^3$ whereafter in the passage past the steam roller 7 steam of from about 1 to 6 bar is injected in a sector in contact with the wire in an amount sufficient for heating the entire mat to 100° C. and for expelling all of the included air. The compression resistance of the mat is reduced significantly in this manner, and compression in the compression roller 8 and holding section 10 can thus be continued with very small forces. In the holding section 10 the glue cures and a board with a uniform density profile with a density of between about 150 to 900 kg/m$^3$, and preferably from about 500 to 700 kg/m$^3$, is obtained.

During the manufacture of thin board a higher density, of the magnitude of from about 800 to 900 kg/m$^3$ is used.

As an alternative or in addition to the steam roller 7, a conventional suction box 12 can be used.

In a similar manner, a conventional steam chest and a vacuum box can be used in the holding section (not shown in the Figure), in order to supply steam at a controlled pressure so as to ensure a sufficiently high temperature during the hardening of the board (depending on the board type, for example) and, respectively, for applying a vacuum in order to control the residual moisture and to make it possible to deflash excess steam at the outlet end of the holding section.

Figure 2:
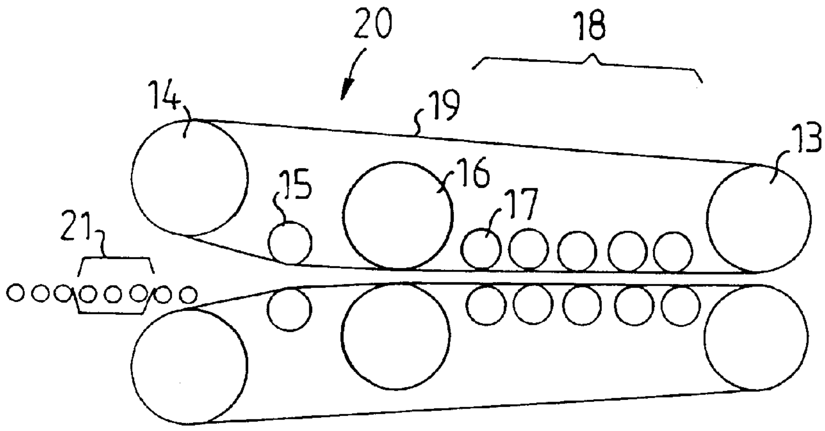
FIG. 2 is a side elevational partially schematic view of a heated belt press for use in step 2 of the method of the present invention, in which the belts are solid steel belts, and which preparation can take place before the inlet in the belt press.

FIG. 2 shows an embodiment of step 2 with a belt press 20 with drive roller 13, stretch and guide roller 14, conducting roller 15, compression roller 15 and rollers 17 in a calibration zone 18, and a steel belt 19. The board manufactured in step 1 is fed in from the left in FIG. 2 through a preparation zone 21 where (if required, see above) a measure suitable for the intended result is taken, whereafter the board is inserted into the inlet of the belt press. The position of the conducting roller 15 is adjustable, so that the time of contact between the board and a hot steel belt is adjustable before the main compression takes place in roller 16, whereby the surface layer of the board is additionally heated. The pressing force during compression of the surface layers in roller 16 is thus reduced. Continued compression of the surface layers takes place successively from one nip to another in the calibration zone 18.

Due to the fact that during the treatment a temperature of at least 50 degrees above the glass transformation temperature is achieved in the surface layer, the material can be easily compressed.

EXAMPLE

Figure 3:
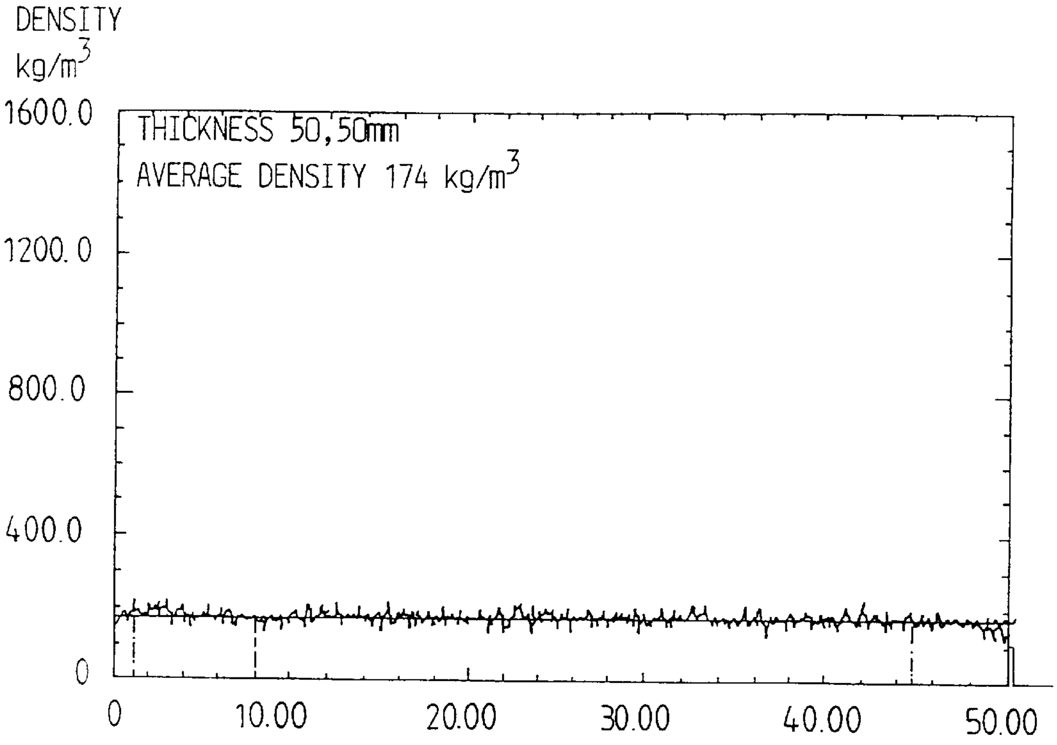
FIG. 3 is a graphical representation showing the density profiles of boards manufactured according to the step 1 of the present invention.

In FIG. 3 a fiberboard with uniform, very low density (average density 174 kg/m$^3$) is shown, which was manufactured solely by the method according to step 1. The density at steam supply is 200 kg/m$^3$.

Figure 4:
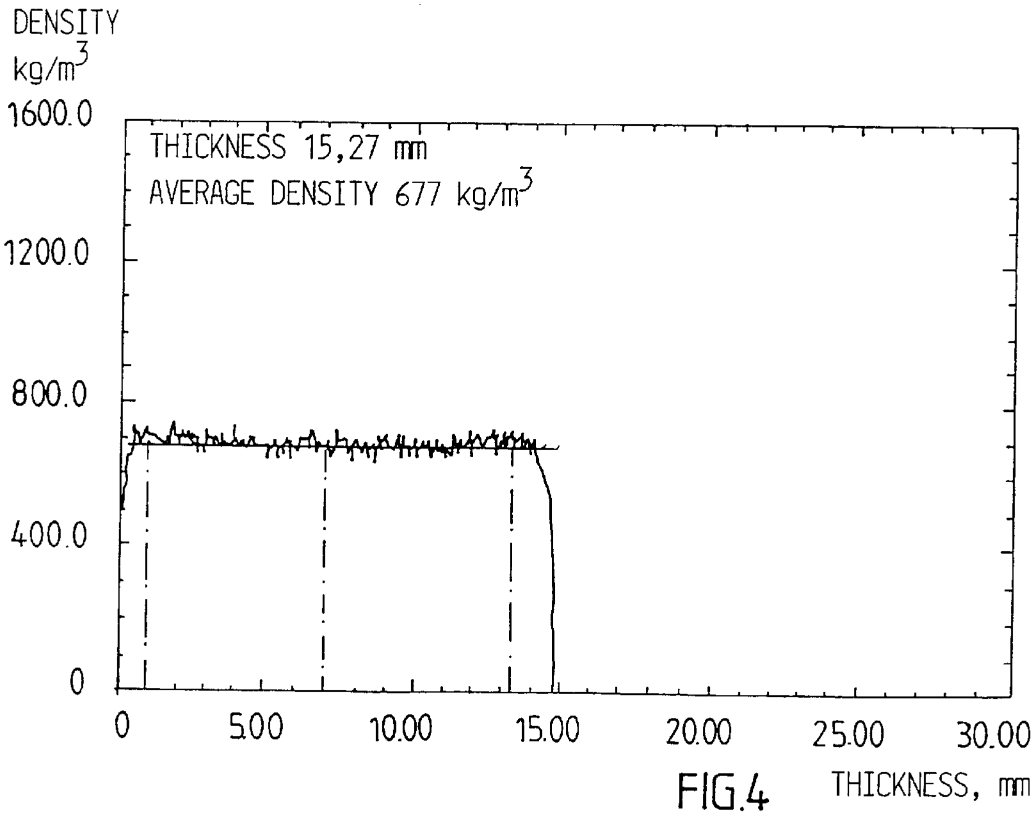
FIG. 4 is a graphical representation showing density profile for boards manufactured according to step 1 of the present invention.

In FIG. 4 a fiberboard with an average density of 677 kg/m$^3$ is shown, which also was manufactured solely by the method according to step 1. The density at steam supply is 300 kg/m$^3$.

In both cases an internal bond strength was obtained which corresponds to conventional board, with the same densities and good surfaces, and with little pre-hardening.

Figure 5:
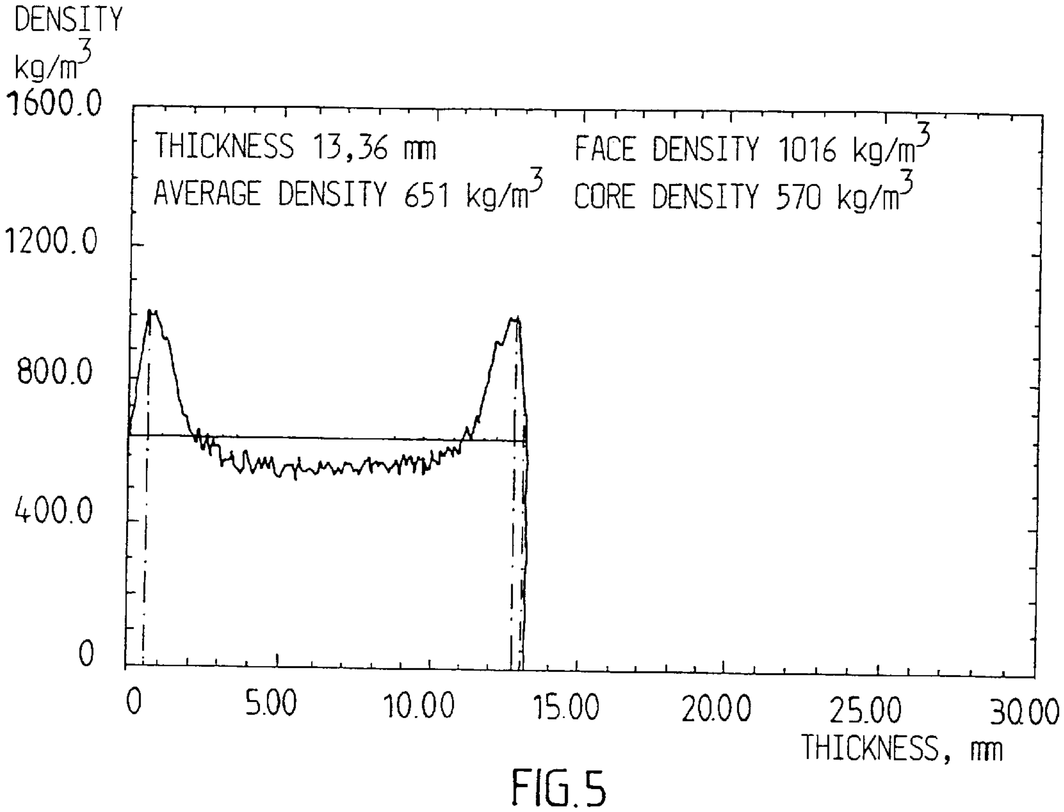
FIG. 5 is a graphical representation showing density profiles of boards manufactured according to steps 1 and 2 of the method of the present invention.

FIG. 5 shows a fiberboard which was manufactured according to step 1 with uniform density similar to FIG. 4 and thereafter was after-pressed in step 2 in a roller press with a steel belt, with the following data:

Steam was injected into the board surfaces prior to the roller pressing. The steel belt temperature was 270° C., and a maximum pressure in compression roller of 60 bar was employed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A continuous method for manufacturing a finished board product from lignocellulose containing material comprising disintegrating said lignocellulose containing material, drying said disintegrated lignocellulose containing material, gluing said dried lignocellulose containing material, forming said glued lignocellulose containing material into a mat, pressing said mat into the form of said board, said pressing of said mat comprising initially pressing said mat in the presence of steam in a heating medium in order to produce a partially pressed, partially hardened, board having a center and first and second surface layers with a substantially uniform density and subsequently pressing said first and second surface layers of said partially pressed board in order to increase the density of said first and second surface layers as compared to the density of said center of said board thereby producing a compressed board with a non-uniform density profile and further hardening said compressed board in order to produce said finished board product.

2. The continuous method of claim 1, wherein said initial pressing of said partially pressed board comprises compressing said partially pressed board to a predetermined thickness and expanding said compressed partially pressed board to a final thickness greater than said predetermined thickness.

3. The continuous method of claim 2, wherein said expanding of said compressed partially pressed board is carried out in the presence of steam at a controlled pressure.

4. The continuous method of claim 2, including applying a vacuum subsequent to said expanding of said compressed partially pressed board to said final thickness.

5. The continuous method of claim 1, wherein said initial pressing of said partially pressed board is carried out in the presence of a sufficient amount of said steam such that air included in said mat is expelled therefrom.

6. The continuous method of claim 1 including storing said partially pressed board prior to said subsequent pressing step.

7. The continuous method of claim 1, including immediately transferring said partially pressed board to said subsequent pressing step.

8. The continuous method of claim 1, wherein said gluing of said dried lignocellulose containing material comprises utilizing a glue having sufficient bond strength so as to form a bond in said initial pressing of said partially pressed board but so as not to form a final bond in said first and second surface layers until said subsequent pressing step.

9. The continuous method of claim 1, including forming said glued lignocellulose containing material into a mat comprising opposing first and second surface mat layers and at least one center layer therebetween, and including initially pressing said mat so as to initially harden said first and second surface mat layers.

10. A continuous method of claim 1 including softening said first and second surface layers of said partially pressed board in connection with said subsequent compressing step.

11. The continuous method of claim 1 wherein said lignocellulose containing material has a glass transition temperature, and including subsequently compressing said first and second surface layers of said partially pressed board while heating said first and second surface layers to a temperature of greater than about 50° C. above said glass transition temperature.

12. The continuous method of claim 1 including coating said first and second surface layers of said partially pressed board with a liquid film prior to said subsequent pressing step.

13. The continuous method of claim 12, wherein said liquid film contains dissolved glue.

14. The continuous method of claim 12, wherein said liquid film contains a surface sealing agent.

15. The continuous method of claim 12, wherein said liquid film includes softening chemicals.

16. The continuous method of claim 1, including pretreating said first and second surface layers of said partially pressed board with a material selected from group consisting of gas and steam prior to said subsequent compressing step.

17. The continuous method of claim 1, wherein said initial pressing of said mat includes a first pressing step free of steam for compressing said mat to a density of between about 150 and 500 kg/m$^3$.

18. The continuous method of claim 17, wherein said first pressing step compresses said mat to a density of between about 250 and 450 kg/m$^3$.

19. The continuous method of claim 1, wherein said initial pressing of said mat comprises compressing said mat to a density of between about 150 and 900 kg/m$^3$.

* * * * *

UNITED STATES PATENT AND TRADEMARK OFFICE
CERTIFICATE OF CORRECTION

PATENT NO. : 6,136,239

DATED : October 24, 2000

INVENTOR(S) : Göran Lundgren *et al.*

It is certified that error appears in the above-identified patent and that said Letters Patent is hereby corrected as shown below:

Column 1, line 17, cancel the "," following the word "mat".
Column 1, line 55, cancel the word "have" and insert --has--.
Column 3, line 35, after "to" insert --the--.
Column 4, line 34, "increase" should read --increased--.
Column 6, line 12, cancel the word "the".
Column 7, line 53, cancel the "," following the word "hardened".
Column 8, line 52, after "from" insert --the--.

Signed and Sealed this

Twenty-second Day of May, 2001

*Attest:*

Nicholas P. Godici

NICHOLAS P. GODICI

*Attesting Officer*

*Acting Director of the United States Patent and Trademark Office*